ENGINE STARTING MECHANISM.
APPLICATION FILED JUNE 9, 1909.
959,014.
Patented May 24, 1910.
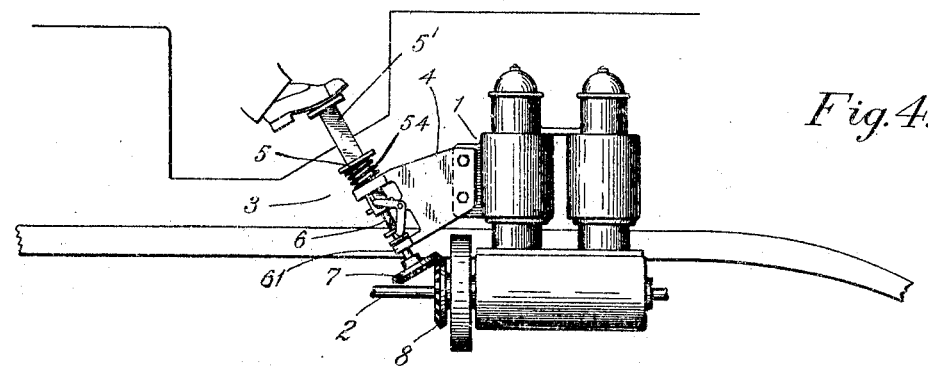
Fig. 4.
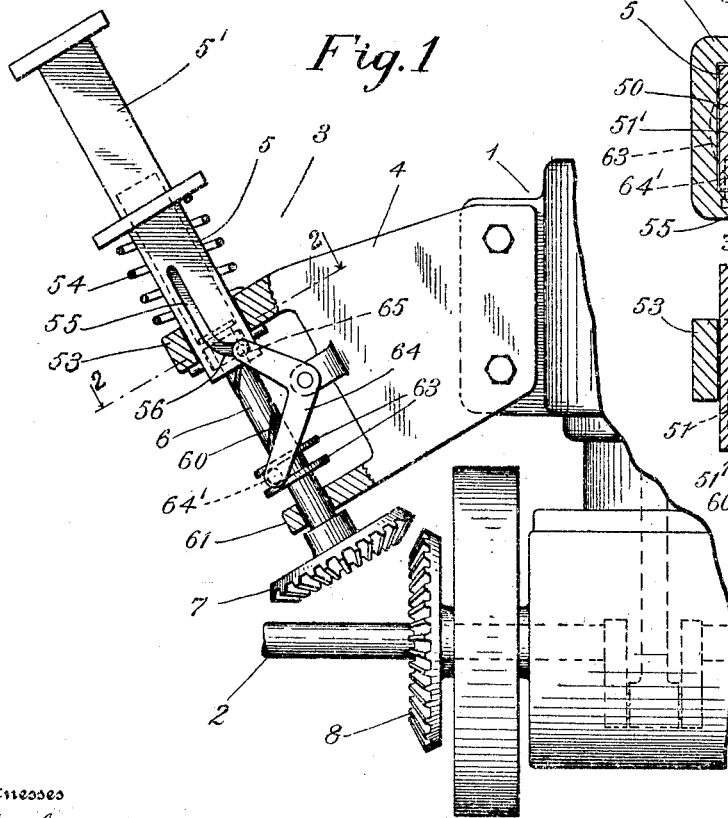
Fig. 1.
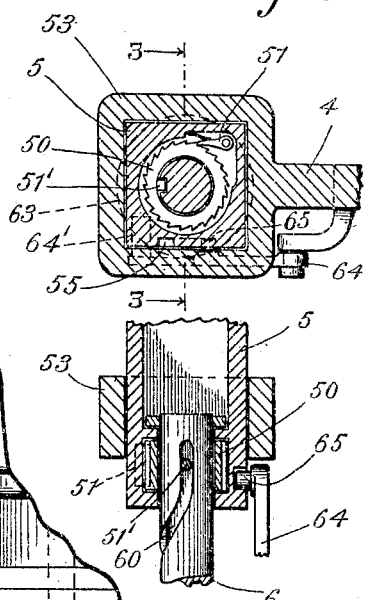
Fig. 2.
Fig. 3.
Witnesses
Alex Currie
Arlita Adams
Inventor
Frank D. James
By Adams & Brooks
Attorneys

UNITED STATES PATENT OFFICE.

FRANK D. JAMES, OF SEATTLE, WASHINGTON.

ENGINE-STARTING MECHANISM.

959,014.  Specification of Letters Patent.  Patented May 24, 1910.

Application filed June 9, 1909. Serial No. 501,197.

*To all whom it may concern:*

Be it known that I, FRANK D. JAMES, a citizen of the United States of America, and a resident of the city of Seattle, in the county of King and State of Washington, have invented certain new and useful Improvements in Engine-Starting Mechanism, of which the following is a specification.

My invention relates to devices for effecting initial movement of explosive engine shafts, and the object thereof is to provide simple and efficient starting mechanism under control of the driver in his customary position or seat.

The invention resides in an improved organization embodying novel features of construction, combination and arrangement of parts as hereinafter set forth and succinctly defined in the appended claims.

In the drawing, wherein like reference numerals designate corresponding parts throughout: Figure 1 is a side elevation in partial section of an engine starter embracing the features of my invention in such form as now preferred by me. Fig. 2 is a transverse section on line 2—2 of Fig. 1, Fig. 3 is a fragmentary longitudinal section on line 3—3 of Fig. 2, and Fig. 4 is a fragmentary side view of a motor carriage showing my invention applied thereto with the parts adjusted for active operation.

Referring now to the drawing, numerals 1 and 2 indicate, respectively the frame and crank shaft of the engine, and 3 designates my improved starting mechanism conveniently supported on a bracket 4 secured to said frame.

The starting mechanism includes relatively slidable and rotatable members, as a slide head 5 and a spindle 6, having spiral driving connection one with the other, and releasable means as coupling parts 7 and 8 for effecting driving connection with the engine shaft. The spiral connection includes a ratchet wheel 50 rotatably seated in a suitable counter bore of head 5 and engaged by a spring pressed pawl 51 mounted thereon. This wheel is adapted to slide on spindle 6 and carries a feather 51' fitting in a spiral groove 60 of the spindle. Head 5 is slidably mounted in a rectangular bearing 53 of bracket 4 and engaged with a retracting spring 54 supported on said bearing, while spindle 6 has its lower end portion engaged in a journal bearing 61 of the bracket.

The coupling part 7 is secured to spindle 6 and normally held from engagement with its companion part 8, which is secured to shaft 2, by means of shifter mechanism including a lever 64 fulcrumed on bracket 4 and provided with a pin 64' projecting between collars 63 secured to the spindle. This lever is preferably connected with head 5 for adjustment to shift the spindle to carry part 7 into and out of engagement with part 8. Such connection I have shown in the form of a wiper 65 secured to said lever and normally engaged in an angular extension, as 56 of a longitudinally extending groove 55 of head 5.

The coupling parts 7 and 8 are conveniently in the form of bevel gears, whereby direct connection between shaft 2 and spindle 6 may be effected with the latter extending obliquely to the shaft as shown.

While other provision may be made for operating head 5 I have shown the same provided with an end extension 5' projecting upwardly adjacent the seat of the carriage for application of the operator's foot to press the head against action of the retracting spring when desired to start the engine. Primary downward movement of head 5 swings lever 64, by engagement of the upper wall of extension 56 with wiper 65, to shift spindle 6 longitudinally and thereby engage coupling part 7 with part 8. Further movement of the head will therefore be transmitted to rotate shaft 2 through the medium of wheel 50 which is held by pawl 51 to straight line movement with its feather bearing in groove 60 of the spindle. When the engine starts the spindle will be advanced in rotation and carry the ratchet wheel therewith, while spring 54, released by removal of the operator's foot, retracts the head with said wheel and finally effects reverse operation of lever 64 to elevate the spindle by engagement of the lower wall of extension 56 with wiper 65. Should the engine fail to start during the first application, retractive action of the spring may be limited, by pressure of the foot against head 5, to prevent reverse operation of the shifter lever and a second active operation effected by downward movement of the foot without opening the coupling.

Having thus described my invention, what I claim as new, and desire to secure by Letters Patent of the United States of America, is:

1. An engine starting appliance comprising in combination with the engine shaft, a rotatably supported member, companion coupling parts secured to said member and shaft, said member being shiftable to couple and uncouple said parts, a slide member having spiral driving connection with said first member, and shifter mechanism connected with said member.

2. An engine starting appliance comprising in combination with the engine shaft, a rotatably supported member, companion coupling parts connected with said member and shaft, said member being shiftable to couple and uncouple said parts, a slidably supported member, a ratchet device carried by said last member having spiral driving connection with said first member, and means for shifting said first member by movement of said slide member.

3. An engine starting appliance comprising in combination with the engine shaft, a rotatable member supported in angular relation to said shaft, means connected with said member and the shaft for coupling the same, a slidably supported member movable longitudinally of said first member, and a ratchet spiral driving connection between said members.

4. An engine starting appliance comprising in combination with the engine shaft, a rotatable member supported in angular relation to said shaft, releasable means connected with said member and the shaft for coupling the same, a slidably supported member movable longitudinally of said first member and yieldingly held in retracted position, a ratchet spiral driving connection between said members, and means whereby movements of said slidably supported member couples and uncouples said coupling means.

5. An engine starting appliance comprising in combination with the engine shaft, a rotatable member supported in angular relation to said shaft, companion coupling parts secured to said member and shaft, said member being shiftable to couple and uncouple said parts, a slidably supported member movable longitudinally of said first member and yieldingly held in retracted position, means connecting said members for shifting the rotatable member by movement of the slidable member, and a ratchet spiral driving connection between said members.

Signed at Seattle, Washington this 4th day of June 1909.

FRANK D. JAMES.

Witnesses:
H. B. Scheitlin,
W. G. Visser.